(12) United States Patent
Xie et al.

(10) Patent No.: US 11,264,891 B2
(45) Date of Patent: Mar. 1, 2022

(54) REDUNDANT ENERGY ACQUISITION CIRCUIT OF POWER MODULE, AND CONTROL METHOD THEREOF

(71) Applicants: NR Electric Co., Ltd, Jiangsu (CN); NR Engineering Co., Ltd, Jiangsu (CN)

(72) Inventors: Yeyuan Xie, Jiangsu (CN); Haiying Li, Jiangsu (CN); Tiangui Jiang, Jiangsu (CN); Minglian Zhu, Jiangsu (CN); Dongming Cao, Jiangsu (CN); Zhongfeng Zhang, Jiangsu (CN)

(73) Assignees: NR ELECTRIC CO., LTD, Jiangsu (CN); NR ENGINEERING CO., LTD (CN)

( * ) Notice: Subject to any disclaimer, the term of this patent is extended or adjusted under 35 U.S.C. 154(b) by 82 days.

(21) Appl. No.: 16/966,459

(22) PCT Filed: Jan. 21, 2019

(86) PCT No.: PCT/CN2019/072533
§ 371 (c)(1),
(2) Date: Jul. 30, 2020

(87) PCT Pub. No.: WO2019/149104
PCT Pub. Date: Aug. 8, 2019

(65) Prior Publication Data
US 2021/0036600 A1      Feb. 4, 2021

(30) Foreign Application Priority Data
Jan. 31, 2018   (CN) .......................... 201810092738.3

(51) Int. Cl.
*H02M 1/32*      (2007.01)
*H02M 7/483*     (2007.01)

(52) U.S. Cl.
CPC ............. *H02M 1/32* (2013.01); *H02M 7/483* (2013.01); *H02M 1/325* (2021.05); *H02M 7/4835* (2021.05)

(58) Field of Classification Search
CPC ........ H02M 1/32; H02M 7/483; H02M 1/325; H02M 7/4835
See application file for complete search history.

(56) References Cited

U.S. PATENT DOCUMENTS

| 4,811,190 A | 3/1989 | Keir et al. | |
|---|---|---|---|
| 2010/0124085 A1* | 5/2010 | Zeng .................. | H02M 1/4208 363/101 |

(Continued)

FOREIGN PATENT DOCUMENTS

| CN | 102427270 A | 4/2012 |
|---|---|---|
| CN | 106329899 A | 1/2017 |

(Continued)

OTHER PUBLICATIONS

Int'l Search Report dated Mar. 19, 2019 in Int'l Application No. PCT/CN2019/072533.

*Primary Examiner* — Rafael O De Leon Domenech
(74) *Attorney, Agent, or Firm* — Panitch Schwarze Belisario & Nadel LLP

(57) ABSTRACT

A redundant energy acquisition circuit of a power module includes at least one power semiconductor device, a first capacitor, and a first bypass switch. The redundant energy acquisition circuit of the power module includes: a power supply board acquiring energy from the first capacitor, supplying power to a control board, and charging a discharge circuit. A first charging circuit has one end connected to a positive electrode of the first capacitor and another end connected to the discharge circuit, and charges the discharge circuit when the power supply board is not operating normally. The control board controls the discharge circuit to (Continued)

close. The discharge circuit discharges and triggers the first bypass switch to close after the discharge circuit is closed.

11 Claims, 11 Drawing Sheets

(56) References Cited

U.S. PATENT DOCUMENTS

| | | | |
|---|---|---|---|
| 2014/0177284 A1 | 6/2014 | Nakano | |
| 2016/0126827 A1* | 5/2016 | Dong | H02M 1/32 |
| | | | 363/50 |
| 2016/0211769 A1* | 7/2016 | Wang | H02M 7/538 |
| 2017/0353098 A1* | 12/2017 | Baek | H02M 7/19 |
| 2018/0183231 A1* | 6/2018 | Xie | H03K 17/08146 |
| 2018/0294668 A1* | 10/2018 | Li | H02J 9/005 |
| 2019/0386560 A1* | 12/2019 | Ying | H02M 1/096 |

FOREIGN PATENT DOCUMENTS

| | | |
|---|---|---|
| CN | 106374767 A | 2/2017 |
| CN | 106849635 A | 6/2017 |
| CN | 106981973 A | 7/2017 |
| CN | 107147305 A | 9/2017 |
| CN | 108111007 A | 6/2018 |
| EP | 3163729 A1 | 5/2017 |
| JP | 2014114577 A | 6/2014 |

\* cited by examiner

US 11,264,891 B2

REDUNDANT ENERGY ACQUISITION CIRCUIT OF POWER MODULE, AND CONTROL METHOD THEREOF

CROSS-REFERENCE TO RELATED APPLICATIONS

This application is a Section 371 of International Application No. PCT/CN2019/072533, filed Jan. 21, 2019, which was published in the Chinese language on Aug. 8, 2019 under International Publication No. WO 2019/149104 A1, which claims priority under 35 U.S.C. § 119 to Chinese Patent Application No. 201810092738.3, filed on Jan. 31, 2018 the disclosures of all of which are incorporated herein by reference.

TECHNICAL FIELD

The present application relates to the technical field of power electronics, in particular to a redundant energy acquisition circuit of a power module and a control method thereof.

BACKGROUND

The voltage source converter technique is a novel conversion technique based on turn-off device IGBTs (insulated gate bipolar transistors) and the PWM (pulse width modulation) technique. Two-level converters consisting of IGBTs have been widely applied on low-voltage occasions. To solve the problems of large equipment stress and system loss, loud noise and harsh electromagnetic environments caused by high-frequency jumps of the output voltage of the two-level converters, three-level voltage source converters are developed to expand the application of voltage source converters in the aspect of voltage level and capacity.

With the emergence of modular multilevel converters (MMCs), multilevel converters, with the voltage level reaching hundreds of kilovolts and the capacity up to thousands of watts, have been successfully applied to the field of flexible direct-current transmission.

The voltage source converters are formed by series connection of a large number of power modules. When one power module malfunctions, a bypass switch is closed to remove the malfunctioned unit to fulfill non-stop operation of a system.

The inventor finds that if an energy acquisition board in the power modules fails, a control board will not be able to operate normally, and the trigger circuit of the bypass switch cannot function, the power module cannot be successfully bypassed, and thus, the system has to be stopped. Thus, how to improve the energy acquisition reliability of the power modules and guarantee reliable closing of the bypass switch has become the key technical factor for improving the reliability of voltage source convener equipment.

Chinese Invention Patent Application No. CN201710228027.X provides a self-trigger circuit for a bypass switch of a multilevel converter sub-module, wherein a capacitor of the bypass switch is charged by the voltage across the two ends of the bypass switch to provide closing energy for the bypass switch. Essentially, the bypass switch capacitor Cc is connected in series with a resistor R1 and is then connected in parallel with a sub-module capacitor Csm to form this circuit. Due to the fact that the capacitance of the bypass switch capacitor is generally hundreds of microfarad and the capacitance of the sub-module capacitor Csm is generally several millifarads to tens of millifarads, it is difficult to charge the bypass switch capacitor to a rated value without causing overvoltage of the sub-module capacitor. In addition, if a sub-module energy acquisition power supply malfunctions, a sub-module control board will not be able to operate or to provide a bypass switch closing instruction. In this case, if a normally-closed switch is connected to the loop of the bypass switch capacitor and a contact control end, the bypass switch capacitor will be short-circuited and cannot be charged. Hence, this solution has the risks of overvoltage damage to the sub-module capacitor and failure to close the bypass switch when the sub-module energy acquisition power supply malfunctions.

SUMMARY

The objective of the invention is to provide a redundant energy acquisition circuit of a power module and a control method thereof. The redundant energy acquisition circuit is applied to voltage source converters to provide another energy acquisition path when the energy acquisition board of a power module of a convener malfunctions and to ensure that the bypass switch of the power module can be reliably closed, thus lowering the probability of system shutdown and having good economical and technical performance.

The embodiments of the present application provide a redundant energy acquisition circuit of a power module. The power module comprises at least one power semiconductor device, a first capacitor and a first bypass switch, and is characterized in that the redundant energy acquisition circuit of the power module comprises a power supply board, a first charging circuit, a control board and a discharge circuit, wherein the power supply board acquires energy from the first capacitor, supplies power to the control board and charges the discharge circuit; the first charging circuit has one end connected to a positive electrode of the first capacitor and another end connected to the discharge circuit, and charges the discharge circuit when the power supply board is not operating normally; the control board controls the discharge circuit to close; and the discharge circuit discharges and triggers the first bypass switch to close being closed.

Furthermore, the redundant energy acquisition circuit of the power module further comprises a second charging circuit, wherein the second charging circuit is connected in parallel with the first capacitor and triggers the discharge circuit to close when the control board is not operating normally.

Furthermore, the second charging circuit comprises a second stabilivolt and a second resistor, wherein a cathode of the second stabilivolt is connected to the positive electrode of the first capacitor, the second resistor has one end connected to an anode of the second stabilivolt and another end connected to a negative electrode of the first capacitor, and after the second stabilivolt is broken down, the discharge circuit is closed.

Furthermore, the redundant energy acquisition circuit of the power module further comprises a fourth switch, wherein the fourth switch is connected in series between a negative electrode of the discharge circuit and the negative electrode of the first capacitor where the power supply board is an isolation-type power supply board.

Furthermore, the discharge circuit comprises a second capacitor and a second switch, wherein the second capacitor has a positive electrode connected to the power supply board and the first charging circuit and a negative electrode connected to a ground of the power supply board, and is charged by the power supply board or the first charging circuit; the second switch has one end connected to a positive electrode of the second capacitor and another end connected to a control end of the first bypass switch; and after the second switch is closed, the second capacitor discharges and triggers the first bypass switch to close.

Furthermore, the first charging circuit comprises a first stabilivolt and a first resistor, wherein a cathode of the first stabilivolt is connected to the positive electrode of the first capacitor, and the first resistor has one end connected to an anode of the first stabilivolt and another end connected to the positive electrode of the second capacitor.

Furthermore, the first charging circuit further comprises a third switch, which is connected to the first charging circuit in series and controls the first charging circuit to open or close.

Furthermore, the discharge circuit further comprises a third resistor, wherein the third resistor is connected in parallel with the second capacitor, the resistance of the third resistor is adjustable, and the charging voltage can be controlled by voltage division of the third resistor and the first resistor.

Furthermore, the discharge circuit further comprises a third stabilivolt being connected in parallel with the second capacitor and being able to stabilize a charging voltage.

Furthermore, the second switch, the third switch and the fourth switch are one or more of mechanical switches, relays, thyristors, IGBTs, IGCTs, GTOs and MOSFETs.

The embodiments of the present invention further provide a control method of a redundant energy acquisition circuit of a power module. The control method is implemented, when a power module malfunctions and needs to be bypassed, to allow a power supply board to acquire energy from a first capacitor, to supply power to a control board and to charge a discharge circuit, wherein the method comprises the following steps: charging the discharge circuit by a first charging circuit when the power supply board is not operating normally; controlling the discharge circuit to close by the control board; and discharging and triggering a first bypass switch to close after the discharge circuit is closed.

Furthermore, the method further comprises the following step: triggering the discharge circuit to close by a second charging circuit when the control board is not operating normally.

Furthermore, before the step of charging the discharge circuit by a first charging circuit when the power supply board is not operating normally, the method further comprises the following step: locking each drive instruction of the power module when the power module malfunctions during normal operation.

Furthermore, the step of charging the discharge circuit by the first charging circuit comprises: breaking clown the first stabilivolt when a first capacitor voltage of the first capacitor reaches a first threshold of a first stabilivolt; and charging a second capacitor by the first capacitor through the first stabilivolt and a first resistor.

Furthermore, the step of controlling the discharge circuit to close by the second charging circuit instead of the control board comprises: continuing to charge the first capacitor until a voltage of the first capacitor reaches a second threshold of a second stabilivolt, breaking down the second stabilivolt, and triggering a second switch to close.

According to the redundant energy acquisition circuit of the power module according to the embodiments of the present application, when an energy acquisition board of the power module malfunctions, the redundant energy acquisition circuit can store energy for a closing circuit of the bypass switch to ensure that the bypass switch has sufficient closing energy; and through the dual configurations of energy storage in the closing circuit of the bypass switch and triggering a closing instruction, the reliability of successful bypassing is improved, the switch module and the capacitors are protected against damage under an overvoltage condition, and forced shutdown of the converter is avoided.

BRIEF DESCRIPTION OF THE DRAWINGS

To more clearly illustrate the technical solutions of the embodiments of the present application, the accompanying drawings required for the description of the embodiments are briefly introduced below. Obviously, the drawings in the following description are merely for some embodiments of the present application, and those ordinarily skilled in the art can obtain other drawings according to the following ones without paying creative effort.

DETAILED DESCRIPTION OF EMBODIMENTS

To make the purposes, technical solutions and advantages of the embodiments of the present application clearer, a more detailed and explicit description of the specific implementations of the technical solutions of the present application will be given below on conjunction with the accompanying drawings and embodiments. Understandably, the specific implementations in the following description are only for the purpose of explanation and are not intended to limit the present application. The embodiments in the following description are merely illustrative ones, and are not all possible ones of the present application. All other embodiments obtained by those skilled in the art based on various modifications to the present application should also fall within the scope of the present application.

It should be understood that the terms such as "first", "second" and "third" adopted in this text to describe various elements or components are not meant to limit these elements or components, and are merely used to distinguish one element or component from another one. Hence, first element(s) or component(s) discussed hereinafter may also be referred to as second element(s) or component(s), without departing from the contents of the present application.

Figure 1A:
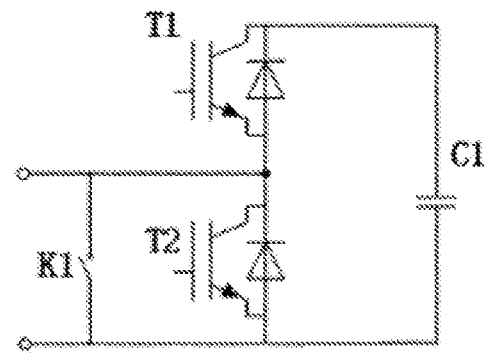
FIG. 1A is a composition diagram of a power module according to one embodiment of the present application.
Figure 1B:
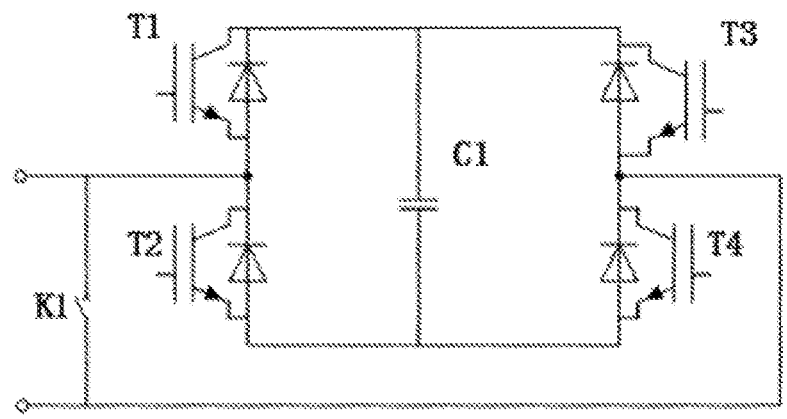
FIG. 1B is a composition diagram of a power module according to another embodiment of the present application.
Figure 1C:
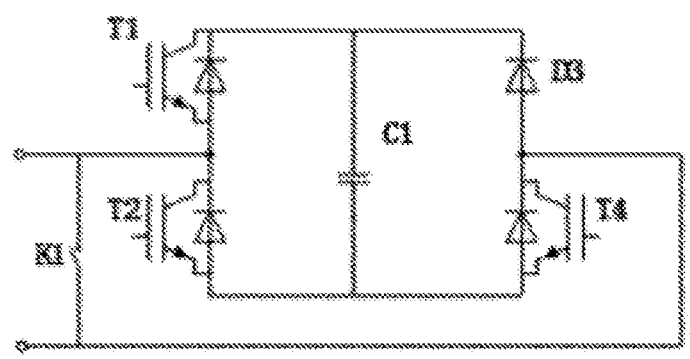
FIG. 1C is a composition diagram of a power module according to another embodiment of the present application.
Figure 1D:
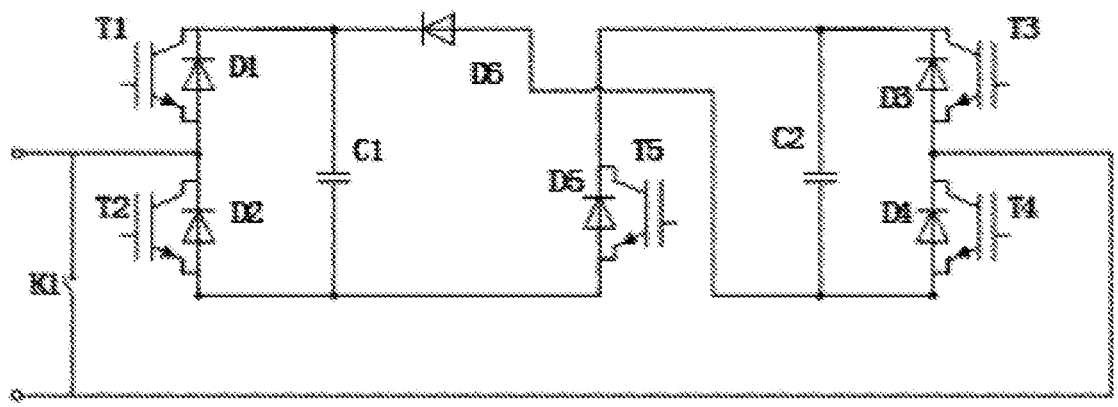
FIG. 1D is a composition diagram of a power module according to yet another embodiment of the present application.

A power module comprises at least one power semiconductor device, a first capacitor C1 and a first bypass switch K1. Or, the power module comprises at least two power semiconductor devices and is of a semi-bridge connection form. Or, the power module comprises at least four power semiconductor devices and is of a fully-bridged connection form. Or, the power module is of other circuit forms including the first capacitor C1 and the first bypass switch K1. FIG. 1A, FIG. 1B, FIG. 1C and FIG. 1D are composition diagrams of the power module according to the embodiments of the present application. As shown in FIG. 1A, the power module is of the semi-bridge connection form. As shown in FIG. 1B, the power module is of the fully-bridged connection form. As shown in FIG. 1C and FIG. 1D, the power modules are of other circuit forms including the first capacitor C1 and the first bypass switch K1. The first bypass switch K1 has a mechanical hold function after being closed, that is, the first bypass switch K1 can be kept in a closed state after being powered off. The closing signal of the first bypass switch K1 is from discharge of a second capacitor C2.

Figure 2:
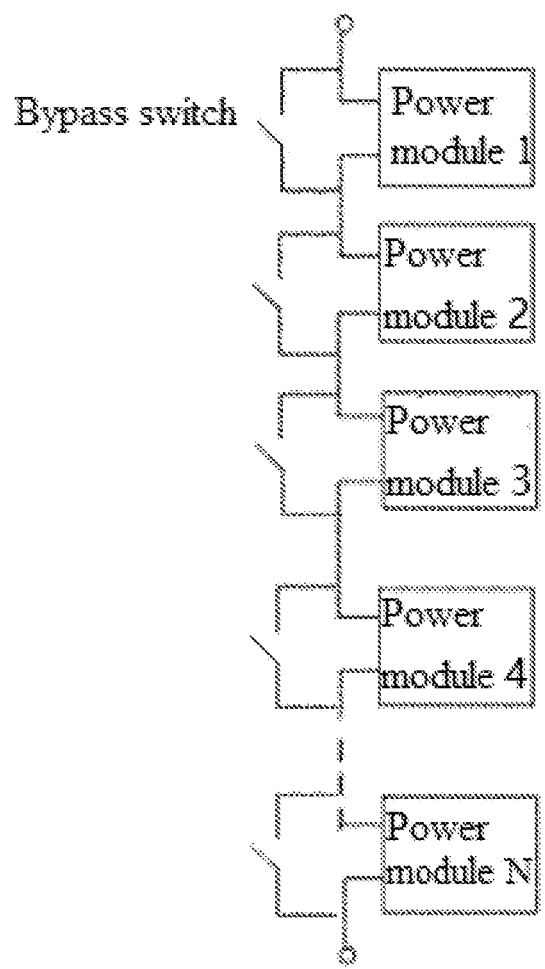
FIG. 2 is an application diagram of an energy acquisition circuit of power modules according to one embodiment of the present application.

FIG. 2 is an application diagram of an energy acquisition module of the power modules according to an embodiments of the present application. As shown in FIG. 2, the power modules are connected in series to form a conversion chain of a voltage source converter.

Figure 3:
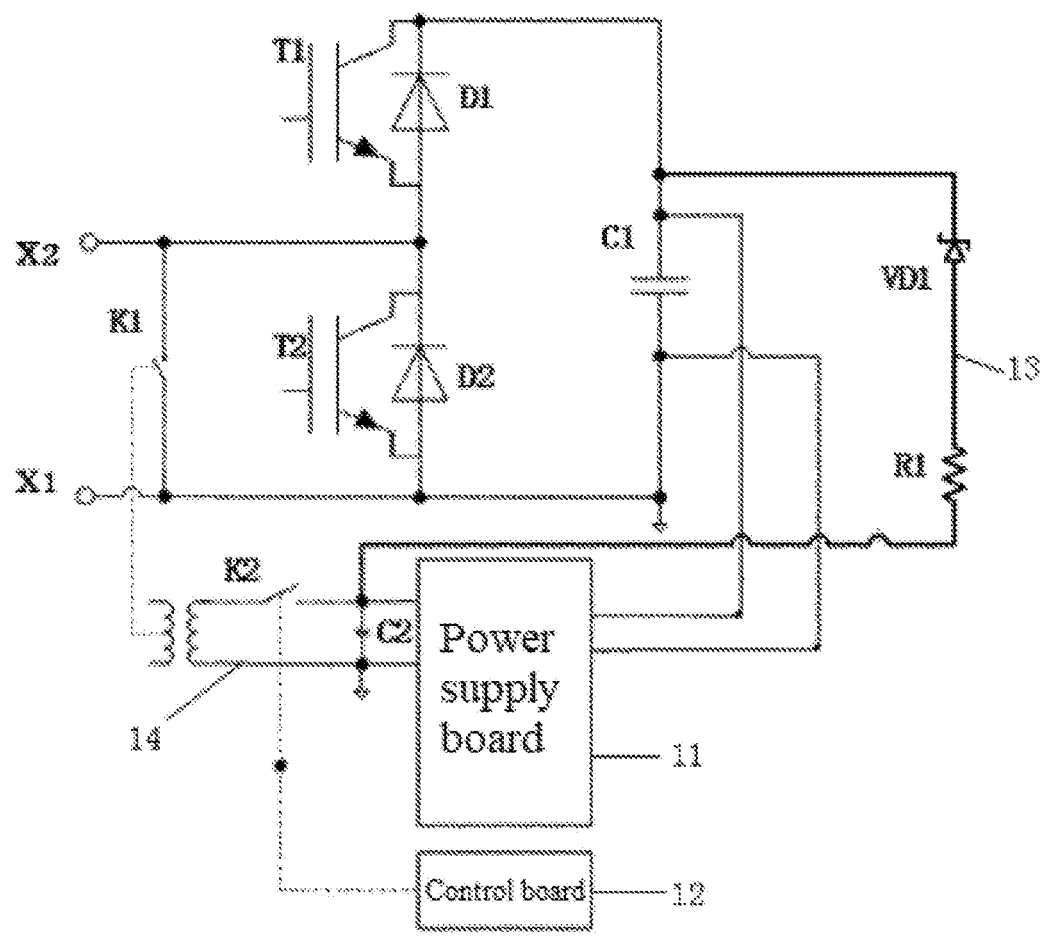
FIG. 3 is a composition diagram of a redundant energy acquisition circuit of a power module according to one embodiment of the present application.

FIG. 3 is a composition diagram of a redundant energy acquisition circuit of a power module according to one embodiment of the present application. The redundant energy acquisition circuit is applied to the power module and comprises a power supply board 11, a control board 12, a first charging circuit 13 and a discharge circuit 14.

The power supply board 11 acquires enemy from the first capacitor C1, supplies power to the control board 12, and charges the discharge circuit 14. The first charging circuit 13 has one end connected to a positive electrode of the first capacitor C1 and another end connected to the discharge circuit 14, and charges the discharge circuit 14 when the power supply board 11 is not operating normally. The control board 12 controls the discharge circuit 14 to close. The discharge circuit 14 discharges and triggers the first bypass switch K1 to close after being closed.

The first charging circuit 13 comprises a first stabilivolt VD1 and a first resistor R1.

A cathode of the first stabilivolt VD1 is connected to the positive electrode of the first capacitor C1. The first resistor R1 has one end connected to an anode of the first stabilivolt VD1 and another end connected to a positive electrode of a second capacitor C2.

The discharge circuit 14 comprises the second capacitor C2 and a second switch K2.

The second capacitor C2 has a positive electrode connected to the power supply board 11 and the first charging circuit 13 and a negative electrode connected to a ground of the power supply board 11, and is charged by the power supply board 11 or the first charging circuit 13. The second switch K2 has one end connected to the positive electrode of the second capacitor C2 and another end connected to a control end of the first bypass switch K1, and after the second switch K2 is closed, the second capacitor C2 discharges and triggers the first bypass switch K1 to close.

The second switch comprises but is not limited to one of a mechanical switch, a relay, a thyristor, an IGBT, an IGCT, a GTO and an MOSFET. That is, the second switch K2 may be a mechanical switch, a relay, or an electronic switch such as a thyristor, an IGBT, an IGCT, a GTO or an MOSFET. Wherein, a trigger signal of the second switch K2 is from the power supply board or the control board.

According to the redundant energy acquisition circuit of the power module according to this embodiment of the present application, when an energy acquisition board of the power module malfunctions, the redundant energy acquisition circuit can store energy for a closing circuit of the bypass switch to ensure that the bypass switch has sufficient closing energy; and through the dual configurations of energy storage in the closing circuit of the bypass switch and triggering a closing instruction, the reliability of successful bypassing is improved, the switch module and the capacitors are protected against damage under an overvoltage condition, and forced shutdown of the converter is avoided.

Figure 4:
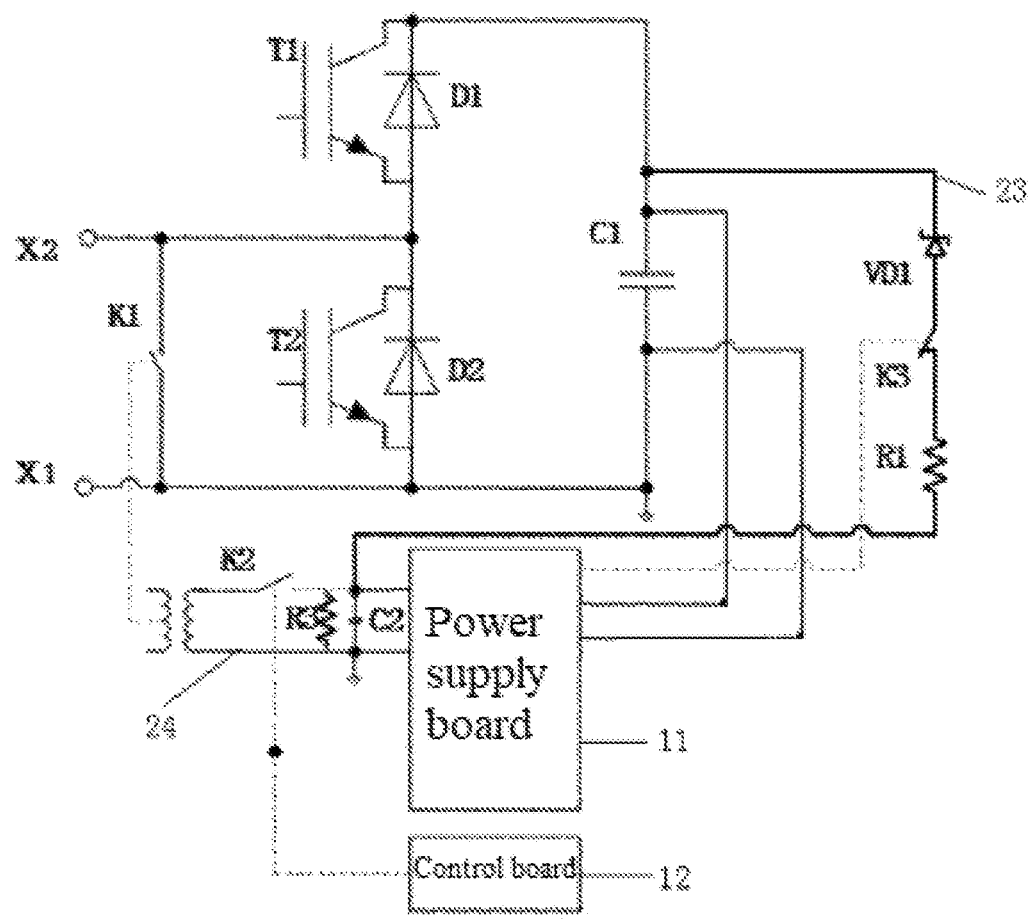
FIG. 4 is a composition diagram of a redundant energy acquisition circuit of a power module according to another embodiment of the present application.

FIG. 4 is a composition diagram of a redundant energy acquisition circuit of a power module according to another embodiment of the present application. As shown in FIG. 4, the redundant energy acquisition circuit is applied to a power module. The power module comprises at least one power semiconductor device, a first capacitor C1, a first bypass switch K1. The redundant energy acquisition circuit of the power module comprises a power supply board 11, a control board 12, a first charging circuit 23 and a discharge circuit 24.

The power supply board 11 acquires energy from the first capacitor C1, supplies power to the control board 12, and charges the discharge circuit 24. The first charging circuit 23 has one end connected to a positive electrode of the first capacitor C1 and another end connected to the discharge circuit 24, and charges the discharge circuit 24 when the power supply board 11 is not operating normally. The control board 12 controls the discharge circuit 24 to close. The discharge circuit 24 discharges and triggers the first bypass switch K1 to close after being closed.

The first charging circuit 23 comprises a first stabilivolt VD1, a first resistor R1 and a third switch K3.

A cathode of the first stabilivolt VD1 is connected to the positive electrode of the first capacitor C1. One end of the first resistor R1 is connected to one end of the third switch K3, another end of the third switch K3 is connected to an anode of the first stabilivolt VD1, and, another end of the first resistor R1 is connected to a positive electrode of a second capacitor C2. The third switch K3 is used to control the first charging circuit 23 to open or close.

The discharge circuit 24 comprises the second capacitor C2, a second switch K2 and a third resistor R3.

The second capacitor C2 has a positive electrode connected to the power supply board 11 and the first charging circuit 23 and a negative electrode connected to a ground of the power supply board 11, and is charged by the power supply board 11 or the first charging circuit 23. The second switch K2 has one end connected to the positive electrode of the second capacitor C2 and another end connected to a control end of the first bypass switch K1. After the second switch K2 is closed, the second capacitor C2 discharges and triggers the first bypass switch K1 to close. The third resistor R3 is connected in parallel with the second capacitor, the resistance of the third resistor R3 is adjustable, and the charging voltage can be controlled by voltage division of the third resistor R3 and the first resistor R1.

The second switch and the third switch comprise but are not limited to one or more of mechanical switches, relays, thyristors, IGBTs, IGCTs, GTOs and MOSFETs. That is, the second switch K2 and the third switch K3 may be mechanical switches, relays, or electronic switches such as thyristors, IGBTs, IGCTs, GTOs or MOSFETs. Wherein, trigger signals of the second switch K2 and the third switch K3 are from the power supply board or the control board.

The first charging circuit further comprises the third switch K3, which has one end connected to an anode of the first stabilivolt VD1 and another end connected to the first resistor R1. The third switch K3 is in a closed state when the power supply board does not operate and is in an open state when the power supply board operates normally.

Figure 5:
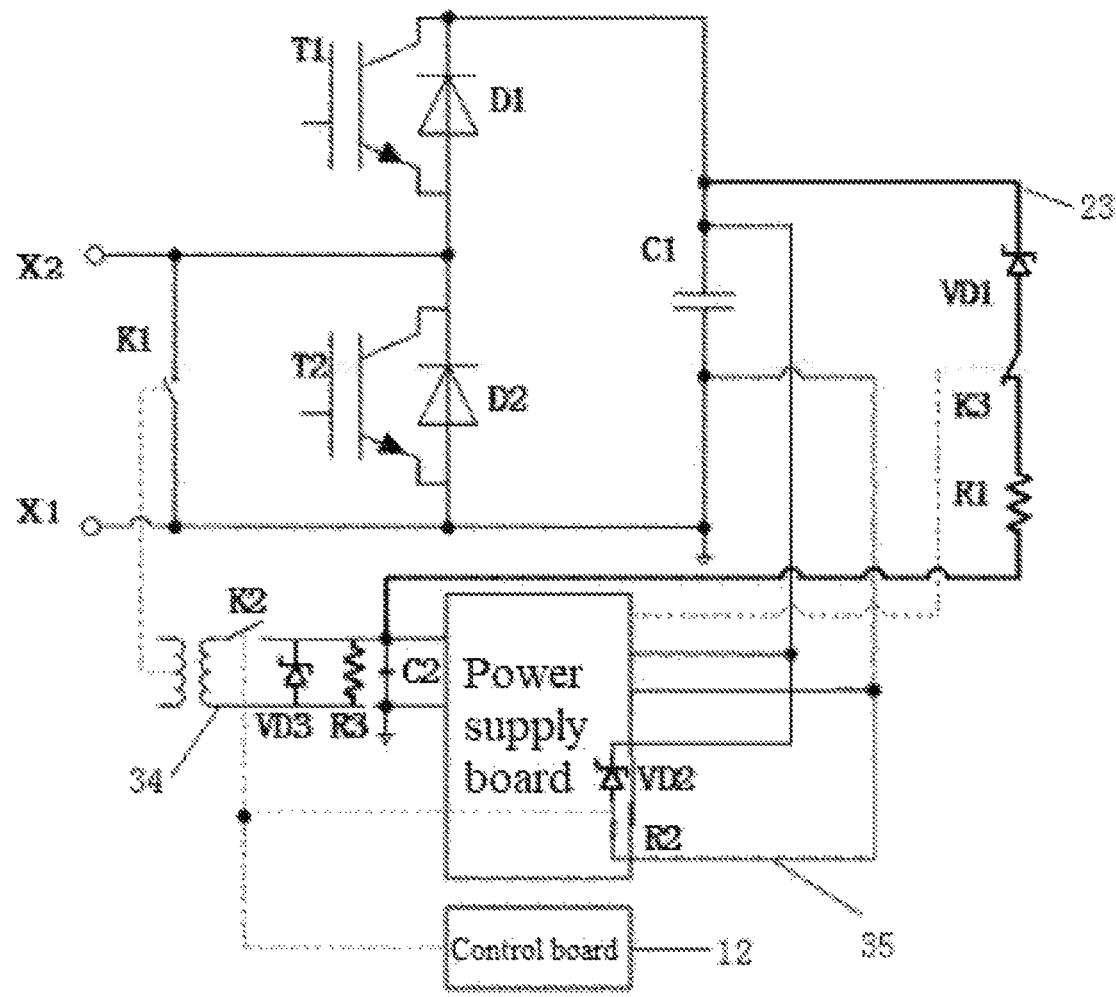
FIG. 5 is a composition diagram of a redundant energy acquisition circuit of a power module according to another embodiment of the present application.

FIG. 5 is a composition diagram of a redundant energy acquisition circuit of a power module according to another embodiment of the present application. The redundant energy acquisition circuit is applied to a power module. The power module comprises at least one power semiconductor device, a first capacitor C1 and a first bypass switch K1. The redundant energy acquisition circuit of the power module comprises a power supply board 11, a control board 12, a first charging circuit 23, a discharge circuit 34 and a second charging circuit 35.

The power supply board 11 acquires energy from the first capacitor C1, supplies power to the control board 12, and charges the discharge circuit 34. The first charging circuit 23 has one end connected to a positive electrode of the first capacitor C1 and another end connected to the discharge circuit 34, and charges the discharge circuit 34 when the power supply board 11 is not operating normally. The control board 12 controls the discharge circuit 34 to close. The discharge circuit 34 discharges and triggers the first bypass switch K1 to close after being closed. The second charging circuit 35 triggers the discharge circuit 34 to close when the control board 12 is not operating normally.

The first charging circuit 23 comprises a first stabilivolt VD1, a first resistor R1 and a third switch K3.

A cathode of the first stabilivolt VD1 is connected to the positive electrode of the first capacitor C1. One end of the first resistor R1 is connected to one end of the third switch K3, another end of the third switch K3 is connected to an anode of the first stabilivolt VD1, and another end of the first resistor R1 is connected to a positive electrode of a second capacitor C2. The third switch K3 is used to control the first charging circuit 23 to open or close.

The discharge circuit 34 comprises the second capacitor C2, a second switch K2, a third resistor R3 and a third stabilivolt VD3.

The second capacitor C2 has a positive electrode connected to the power supply board 11 and the first charging circuit 23 and a negative electrode connected to a ground of the power supply board 11, and is charged by the power supply board 11 or the first charging circuit 23. The second switch K2 has one end connected to the positive electrode of the second capacitor C2 and another end connected to a control end of the first bypass switch K1. After the second switch K2 is closed, the second capacitor C2 discharges and triggers the first bypass switch K1 to close. The third resistor R3 and the third stabilivolt VD3 are connected in parallel with the second capacitor, the resistance of the third resistor R3 is adjustable, and the charging voltage can be controlled by voltage division of the third resistor R3 and the first resistor R1 and can be stabilized by the third stabilivolt VD3.

The second charging circuit 35 comprises a second stabilivolt VD2 and a second resistor R2.

A cathode of the second stabilivolt VD2 is connected to the positive electrode of the first capacitor C1. The second resistor R2 has one end connected to an anode of the second stabilivolt VD2 and another end connected to a negative electrode of the first capacitor C1, and after the second stabilivolt VD2 is broken down, the second switch K2 is closed. The second stabilivolt VD2 can be replaced with a diode, which can prevent power output by the power supply board from recharging sub-module capacitors.

The second switch K2 comprises but is not limited to one of a mechanical switch, a relay, a thyristor, an IGBT, an IGCT, a GTO and an MOSFET. That is, the second switch K2 may be a mechanical switch, a relay, or an electronic switch such as a thyristor, an IGBT, an IGCT, a GTO or an MOSFET. Wherein, a trigger signal of the second switch K2 is from the power supply board or the control board.

The redundant energy acquisition circuit of the power module comprises the first stabilivolt VD1, the second stabilivolt VD2, the second switch K2, the first resistor R1, the second resistor R2, the second capacitor C2, the power supply board and the control board. The cathode of the first stabilivolt VD1 is connected to the positive electrode of the first capacitor C1, and the anode of the first stabilivolt VD1 is connected in series with the first resistor R1 and is then connected to the positive electrode of the second capacitor C2; the negative electrode of the second capacitor C2 is connected to the negative electrode of the first capacitor C1; the cathode of the second stabilivolt VD2 is connected to the positive electrode of the first capacitor C1; the anode of the second stabilivolt VD2 is connected to the second resistor R2; another end of the second resistor R2 is connected to the negative electrode of the first capacitor C1; the first bypass switch K1 is connected in parallel between end x1 and end x2 of the power module; the power supply board acquires energy from the first capacitor C1, supplies power to the control board, and charges the second capacitor C2, and the control board controls the first bypass switch K1 to close by triggering the second switch K2.

According to the redundant energy acquisition circuit of the power module according to this embodiment of the present application, when the control board malfunctions, the second charging circuit breaks down the second stabilivolt by increasing the capacitor voltage to trigger a closing instruction of the bypass switch; and the second stabilivolt can be replaced with a diode, which can prevent power output by the power supply board from recharging sub-module capacitors.

Figure 6:
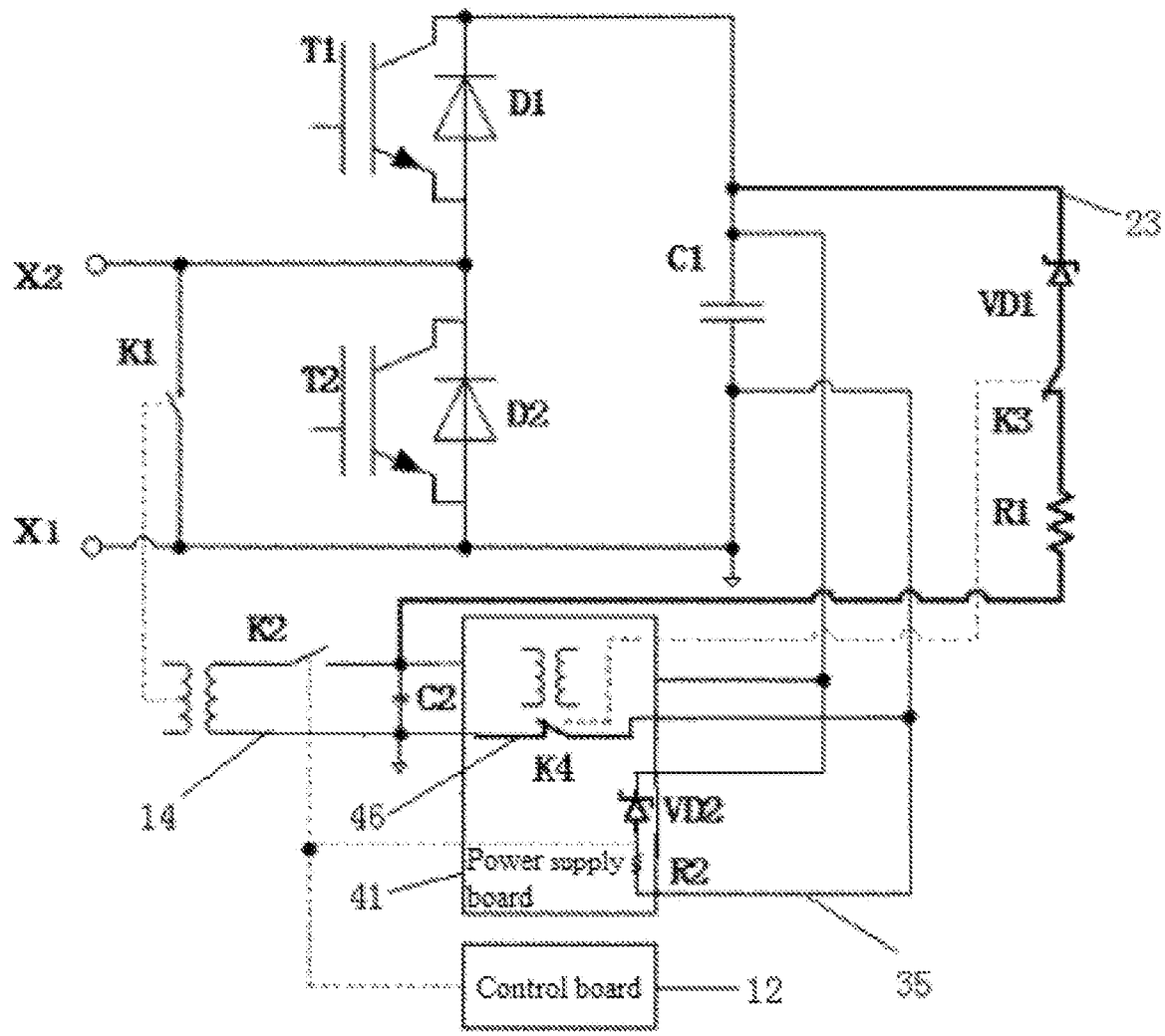
FIG. 6 is a composition diagram of a redundant energy acquisition circuit of a power module according to yet another embodiment of the present application.

FIG. 6 is a composition diagram of a redundant energy acquisition circuit of a power module according to another embodiment of the present application. The redundant energy acquisition circuit is applied to a power module. The power module comprises at least one power semiconductor device, a first capacitor C1 and a first bypass switch K1. The redundant energy acquisition circuit of the power module comprises a power supply board 41, a control board 12, a first charging circuit 23, a discharge circuit 14, a second charging circuit 35 and a fourth switch 46.

In this embodiment, the power supply board 41 is an isolation-type power supply board and comprises an isolation transformer, and a primary-side circuit and a secondary-side circuit of the isolation transformer do not share the same ground. The power supply board 41 acquires energy from the first capacitor C1, supplies power to the control board 12, and charges the discharge circuit 14. The first charging circuit 23 has one end connected to a positive electrode of the first capacitor C1 and another end connected to the discharge circuit 14, and charges the discharge circuit 14 when the power supply board 41 is not operating normally. The control board 12 controls the discharge circuit 14 to close. The discharge circuit 14 discharges and triggers the first bypass switch K1 to close after being closed. In the case where the power module and the power supply board 41 do not share the same ground, the fourth switch 46 is connected in series between a ground of the power module and a ground of the power supply board 41 to connect the ground of the power module with the ground the power supply board 41.

The first charging circuit 23 comprises a first stabilivolt VD1, a first resistor R1 and a third switch K3.

A cathode of the first stabilivolt VD1 is connected to the positive electrode of the first capacitor C1. One end of the first resistor R1 is connected to one end of the third switch K3, another end of the third switch K3 is connected to an anode of the first stabilivolt VD1, and another end of the first resistor R1 is connected to a positive electrode of a second capacitor C2. The third switch K3 is used to control the first charging circuit 23 to open or close.

The discharge circuit 14 comprises the second capacitor C2 and a second switch K2.

The second capacitor C2 has a positive electrode connected to the power supply board 41 and the first charging circuit 23 and a negative electrode connected to a ground of the power supply board 41, and is charged by the power supply board 41 or the first charging circuit 23. The second switch K2 has one end connected to the positive electrode of the second capacitor C2 and another end connected to a control end of the first bypass switch K1. After the second switch K2 is closed, the second capacitor C2 discharges and triggers the first bypass switch K1 to close.

The second switch K2 and the fourth switch K4 comprise but are not limited to one or more of mechanical switches, relays, thyristors, IGBTs, IGCTs, GTOs and MOSFETs. That is, the second switch K2 and the fourth switch K4 may be mechanical switches, relays, or electronic switches such as thyristors, IGBTs, IGCTs, GTOs or MOSFETs. Wherein, trigger signals of the second switch and the fourth switch are from the power supply board or the control board.

The power supply board in the redundant energy acquisition circuit of the power module is an isolation-type power supply board and comprises an isolation transformer, and a primary-side circuit and a secondary-side circuit of the isolation transformer do not share the same ground. The redundant energy acquisition circuit of the power module further comprises a fourth switch K4 which is connected in series between the negative electrode of the second capacitor C2 and the negative electrode of the first capacitor C1. The fourth switch K4 is in a closed state when the power supply board does not operate and is in an open state when the power supply board operates normally.

The redundant energy acquisition circuit of the power module according to the embodiments of the present application can be applied to non-isolation and isolation-type energy acquisition boards to fulfill the same function and improve the reliability of original systems, and has practical engineering value.

Figure 7A:
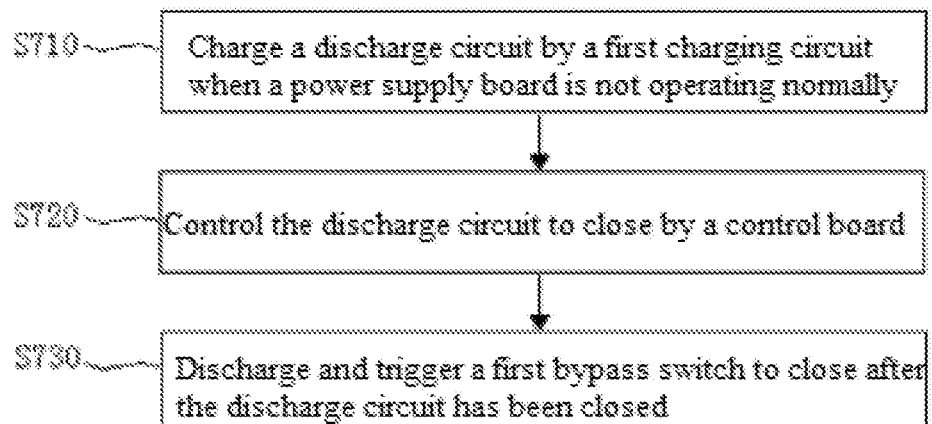
FIG. 7A is a flow diagram of a control method of a redundant energy acquisition circuit of a power module according to one embodiment of the present application.

FIG. 7A is a flow diagram of a control method of a redundant energy acquisition circuit of a power module according to one embodiment of the present application. The control method comprises the following steps:

S710: when a power supply board is not operating normally, a first charging circuit charges a discharge circuit.

When a power module is started, a first capacitor C1 in the power module starts to be charged. When the power module malfunctions and needs to be bypassed, if the power supply board is operating normally, the power supply board acquires energy from the first capacitor C1, supplies power to a control board, and charges a second capacitor C2 of the discharge circuit.

If the power supply board is not operating normally, the first capacitor C1 is charged until the voltage of the first capacitor C1 reaches a first threshold of a first stabilivolt VD1, and at this moment, the first stabilivolt VD1 is broken down; and the first capacitor C1 charges the second capacitor C2 through the first stabilivolt VD1 and a first resistor R1.

S720: the control board controls the discharge circuit to close.

The control board controls the discharge circuit to close, that is, the control board sends out an instruction for closing a second switch K2. If the control board fails to send out the instruction for closing the second switch K2, the malfunctioned power module continues to operate.

S730: the discharge circuit discharges and triggers a first bypass switch to close after being closed.

After the second switch K2 is closed, the discharge circuit closes, and the second capacitor C2 discharges and triggers the first bypass switch K1 to close to complete bypassing.

Figure 7B:
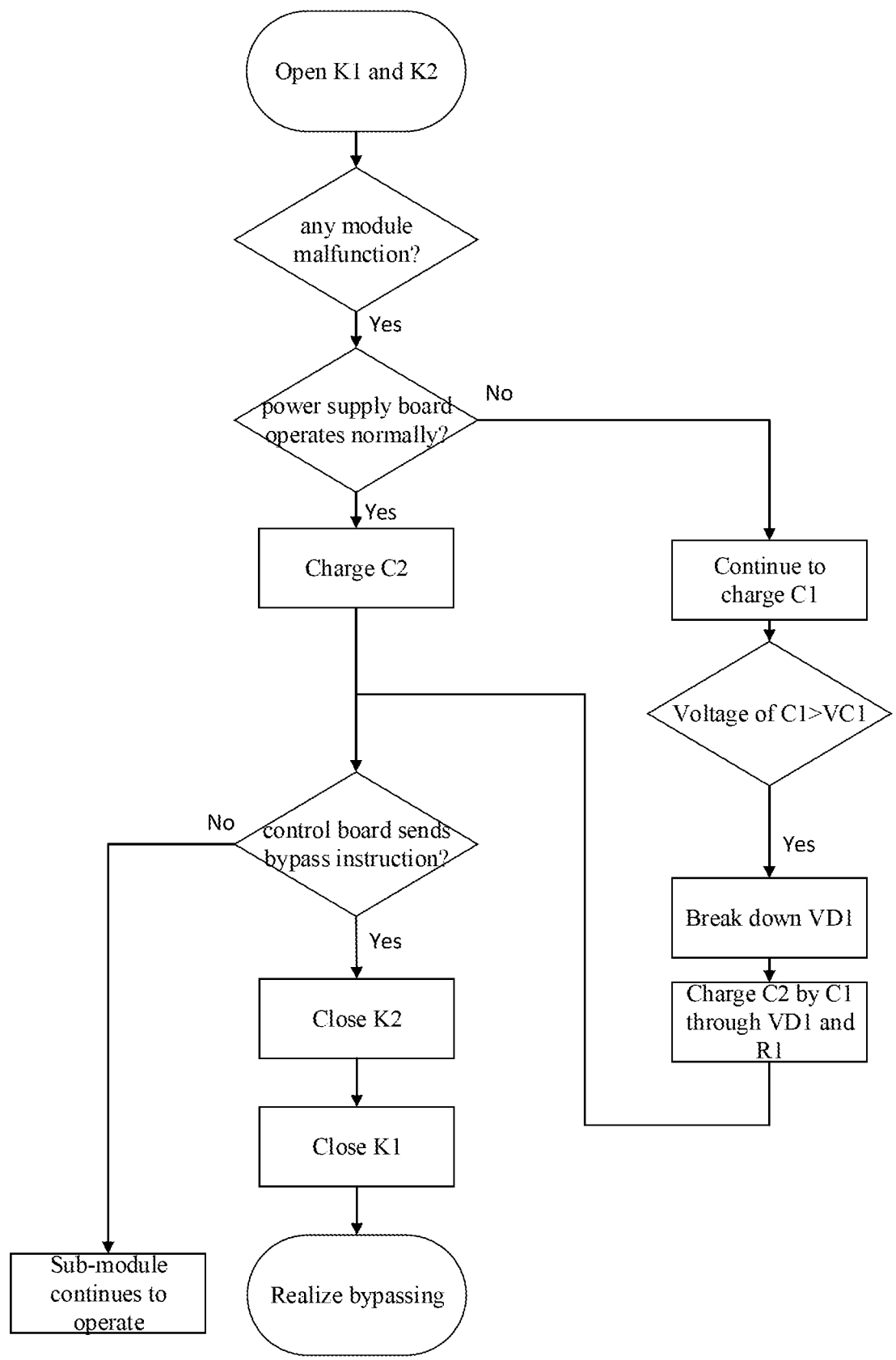
FIG. 7B is a flow diagram of the control method of the redundant energy acquisition circuit of the power module shown in FIG. 7A of the present application.

FIG. 7B is a flow diagram of the control method of the redundant energy acquisition circuit of the power module, shown in FIG. 7A of the present application. As shown in FIG. 7B, the control method specifically comprises the following steps:

In the case where the power module malfunctions and needs to be bypassed after being started, the first bypass switch K1 and the second switch K2 are open in the initial state, and the first capacitor C1 in the power module starts to be charged. Whether the power supply board is operating normally is determined; if the power supply board is operating normally, the control board sends the instruction for closing the second switch K2, and the second capacitor C2 discharges and triggers the first bypass switch K1 to close; if the power supply board is not operating normally, the first capacitor C1 continues to be charged, and a first power device VD1 is broken down when the capacitor voltage reaches a first threshold $V_{c1}$ of the first power device VD1. The first capacitor C1 charges the second capacitor C2 through the first power device VD1, the third switch K3 and the first resistor R1. The control board triggers the second switch K2 to close, and the second capacitor C2 discharges and triggers the first bypass switch K1 to close to realize bypassing.

Figure 8A:
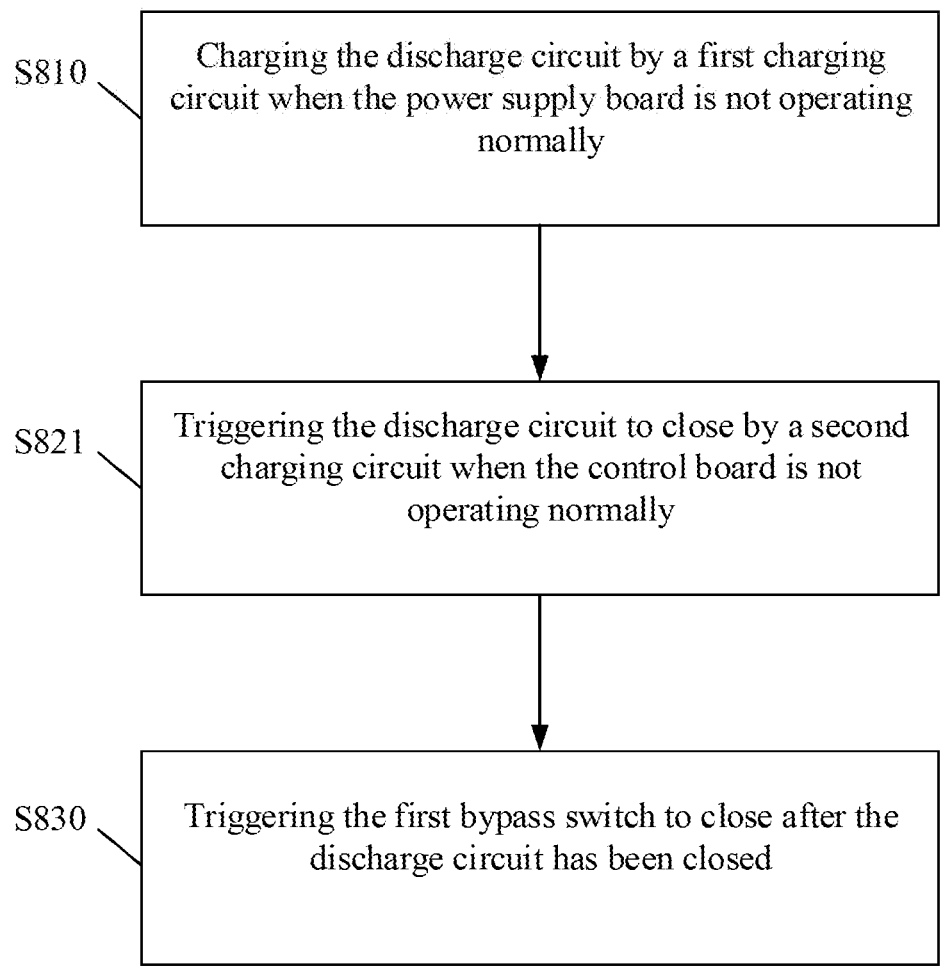
FIG. 8A is a flow diagram of a control method of a redundant energy acquisition circuit of a power module according to another embodiment of the present application.

FIG. 8A is a flow diagram of a control method of a redundant energy acquisition circuit of a power module according to another embodiment of the present application. The control method comprises the following steps:

Step S810: when a power supply board is not operating normally, a first charging circuit charges a discharge circuit.

In the case where a power module malfunctions and needs to be bypassed after being started, a first capacitor C1 in the power module starts to be charged; if the power supply board is operating normally, the power supply board acquires energy from the first capacitor C1, supplies power to a control board, and charges a second capacitor C2 of the discharge circuit.

If the power supply board is not operating normally, the first capacitor C2 is charged until the voltage of the first capacitor C1 reaches a first threshold $V_{c1}$ of a first stabilivolt VD1, and at this moment, the first stabilivolt VD1 is broken down; and the first capacitor C1 charges the second capacitor C2 through the first stabilivolt VD1 and a first resistor R1.

Step S821: when the control board is not operating normally, a second charging circuit triggers the discharge circuit to close.

The situation where the control board is not operating normally includes a control board malfunction caused by a malfunction of the power supply board or a self malfunction of the control board, and in this situation, the control board cannot send an instruction for closing a second switch K2; or, although the control board has sent an instruction for closing the second switch K2, a first bypass switch K1 fails to be closed. This embodiment is applicable to the situation where although the control board has sent an instruction for closing the second switch K2, the first bypass switch K1 fails to be closed.

When the control board is not operating normally, the second charging circuit triggers the second switch K2 to close. Wherein, the second charging circuit comprises a second stabilivolt VD2 and a second resistor R2. The first capacitor C1 continues to be charged until the voltage of the first capacitor C1 reaches a second threshold $V_{c2}$ of the second stabilivolt VD2, and at this moment, the second stabilivolt VD2 is broken down and triggers the second switch K2 to close.

Step S830: the discharge circuit discharges and triggers the first bypass switch to close after being closed.

After the second switch K2 is closed, the discharge circuit closes, and the second capacitor C2 discharges and triggers the first bypass switch K1 to close to realize bypassing.

In this embodiment, when the power supply board is not operating normally, the first charging circuit replaces the power supply board to charge the discharge circuit; and when the control board is not operating normally, the second charging circuit replaces the control board to trigger the discharge circuit to close. The above two situations can be combined according to the need.

Figure 8B:
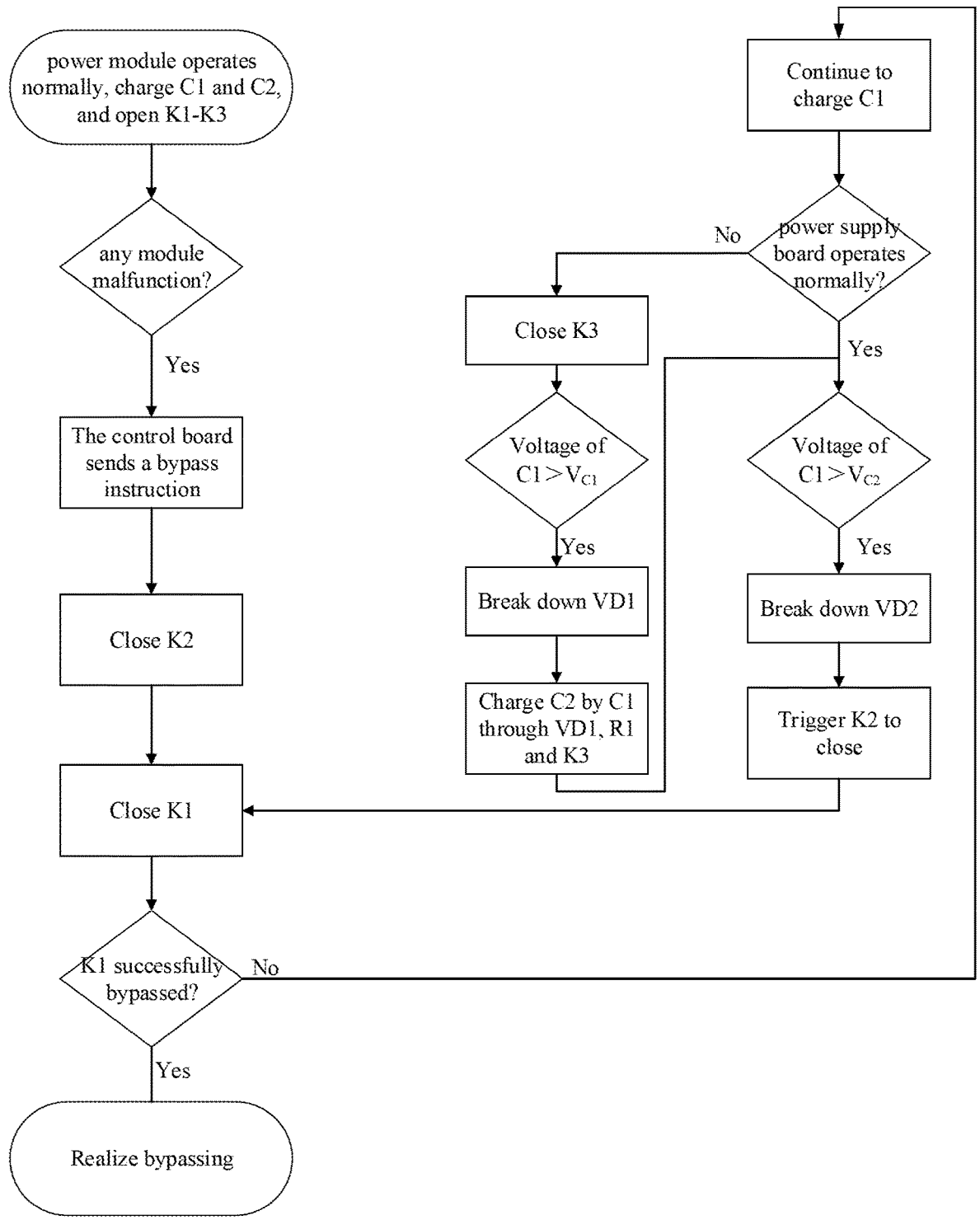
FIG. 8B is a flow diagram of the control method of a redundant energy acquisition circuit of the power module shown in FIG. 8A of the present application.

FIG. 8B is a flow diagram of the control method of the redundant energy acquisition circuit of the power module shown in FIG. 8A of the present application. The control method specifically comprises the following steps:

As shown in FIG. 8B, when the power module is operating normally, the first bypass switch K1, the second switch K2 and the third switch K3 are all open in the initial state. When it is detected that the power module malfunctions and needs to be bypassed, drive instructions of all switch modules are locked. If the control board is operating normally, the control board sends an instruction for closing the second switch K2 to trigger the first bypass switch K1 to close. If the first bypass switch K1 is closed successfully, the process ends, and if the first bypass switch K1 fails to be closed, the following steps are performed.

The first capacitor C1 continues to be charged, and whether the power supply board is operating normally is determined.

If the power supply board is operating normally, the second stabilivolt VD2 is broken down when the capacitor voltage reaches the second threshold $V_{c2}$ of the second stabilivolt VD2; and the second switch K2 is triggered to close, and the second capacitor C2 discharges and triggers the first bypass switch K1 to close.

If the power supply board is not operating normally, the third switch K3 is closed, the first capacitor C1 continues to be charged, and when the capacitor voltage reaches the first threshold $V_{c1}$ of the first stabilivolt VD1, the first stabilivolt VD1 is broken down.

The first capacitor C1 continues to be charged, and when the capacitor voltage reaches the second threshold $Vc_2$ of the second stabilivolt VD2, the second stabilivolt VD2 is broken down. The second charging circuit triggers the second switch K2 to close, and the second capacitor C2 discharges and triggers the first bypass switch K1 to close to realize bypassing.

Figure 9:
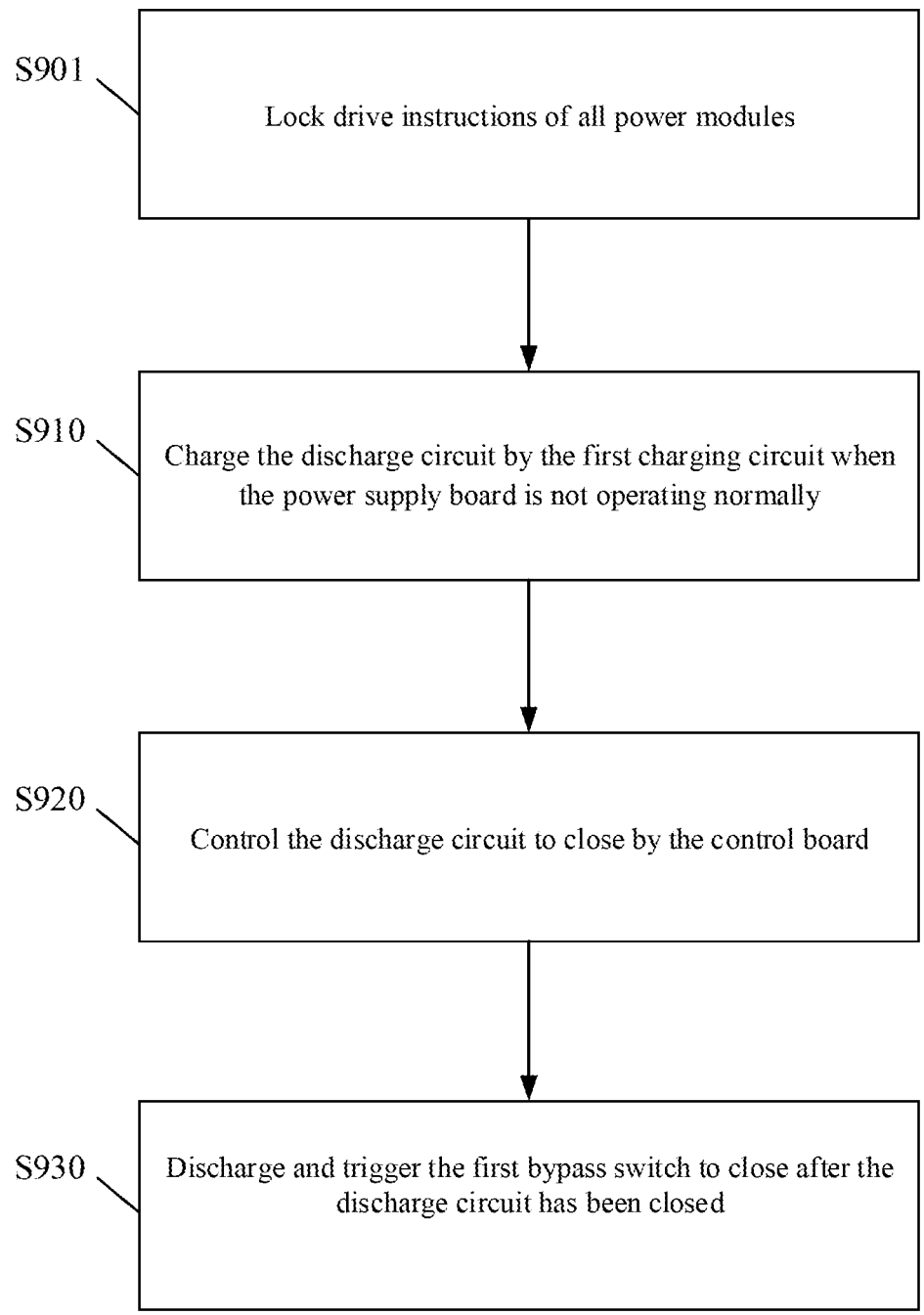
FIG. 9 is a flow diagram of a control method of a redundant energy acquisition circuit of a power module according to another embodiment of the present application.

FIG. 9 is a flow diagram of a control method of a redundant energy acquisition circuit of a power module according to another embodiment of the present application. The control method comprises the following steps:

S901: when a power module malfunctions during normal operation, each drive instruction of the power module are locked.

When the power module malfunctions and needs to be bypassed, the each drive instructions of the power module should be locked at first.

S910: when a power supply board is not operating normally, a first charging circuit charges a discharge circuit.

A first capacitor C1 in the power module is charged; if the power supply board is operating normally, the power supply board acquires energy from the first capacitor C1, supplies power to a control board and charges the discharge circuit; if the power supply board is not operating normally, the first capacitor C1 is charged until the voltage of the first capacitor C1 reaches a first threshold of a first stabilivolt VD1, and at this moment, the first stabilivolt VD1 is broken down; and the first capacitor C1 charges a second capacitor C2 through the first stabilivolt VD1 and a first resistor R1.

S920: the control board controls the discharge circuit to close.

The control board controls the discharge circuit to close, that is, the control board sends an instruction for closing a second switch K2. If the control board fails to send the instruction for closing the second switch K2, the malfunctioned power module continues to operate.

S930: the discharge circuit discharges and triggers a first bypass switch to close after being closed.

After the second switch K2 is closed, the discharge circuit closes, and the second capacitor C2 discharges and triggers the first bypass switch K1 to close to realize bypassing.

Figure 10:
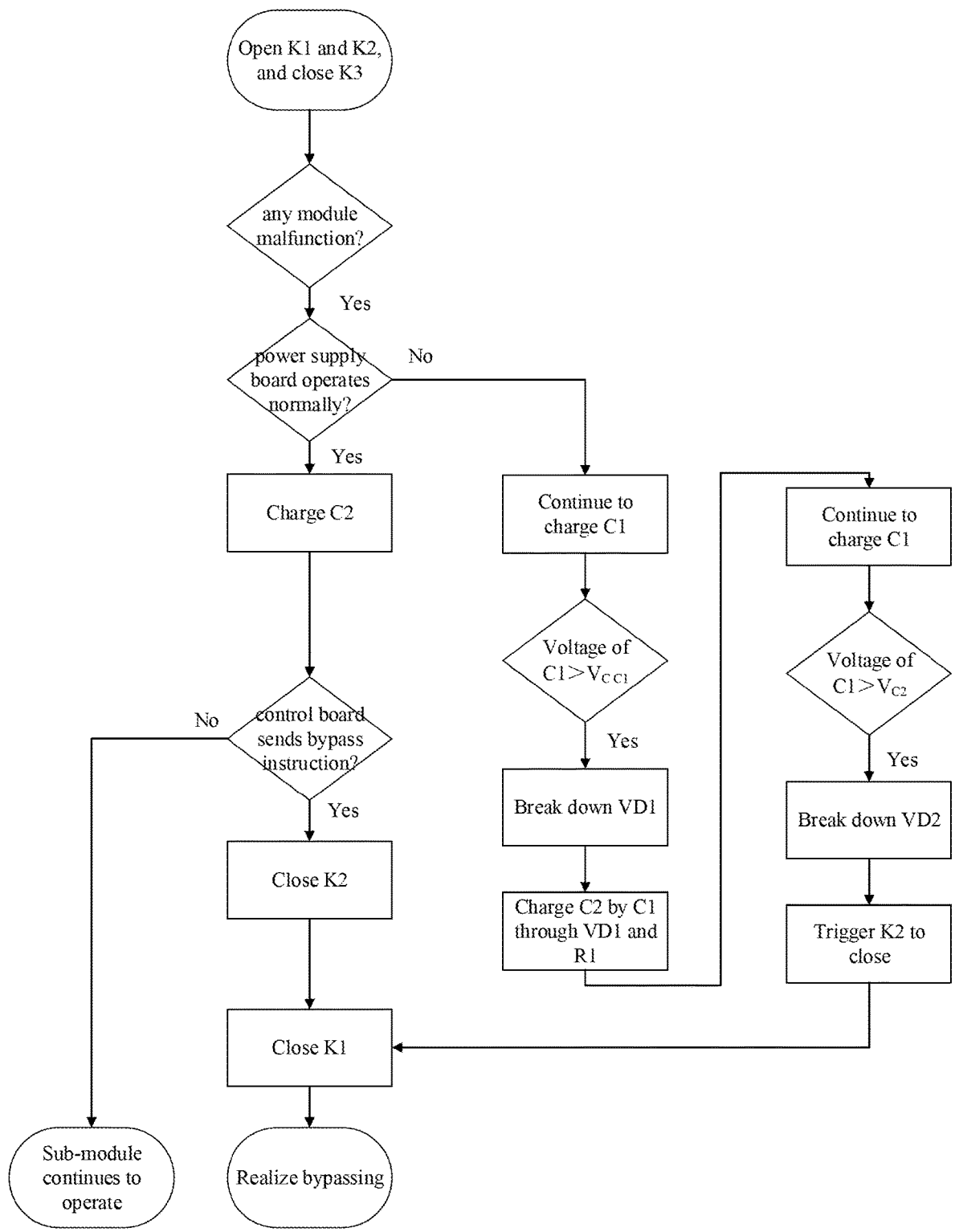
FIG. 10 is a flow diagram of a control method of a redundant energy acquisition circuit of a power module according to yet another embodiment of the present application.

FIG. 10 is a flow diagram of a control method of a redundant energy acquisition circuit of a power module according to another embodiment of the present application. The control method comprises the following steps:

When a power module is started, a first bypass switch K1 and a second switch K2 are open, and a third switch K3 is closed, in the initial state. When the power module malfunctions and needs to be bypassed, a first capacitor C1 in the power module starts to be charged. Whether a power supply board is operating normally is determined; if the power supply board is operating normally, a control board sends an instruction for closing the second switch K2, and a second capacitor C2 discharges and triggers the first bypass switch K1 to close; or, if the power supply board is not operating normally, the first capacitor C1 continues to be charged. When the capacitor voltage reaches a first threshold Vc1 of a first stabilivolt VD1, the first stabilivolt VD1 is broken down. The first capacitor C1 charges the second capacitor C2 through the first stabilivolt VD1, the third switch K3 and a first resistor R1. The first capacitor C1 continues to be charged, and when the capacitor voltage of the first capacitor C1 reaches a second threshold Vc2 of a second stabilivolt VD2, the second stabilivolt VD2 is broken down. The second switch K2 is triggered to close, and the second capacitor C2 discharges and triggers the first bypass switch K1 to close.

According to the redundant energy acquisition circuit of the power module according to the present invention, when an energy acquisition board of the power module malfunctions, the redundant energy acquisition circuit can store energy for a closing circuit of the bypass switch to ensure that the bypass switch has sufficient closing energy. When the control board breaks down, the capacitor voltage is increased to break down the stabilivolt to trigger a closing instruction of the bypass switch. The stabilivolt can be replaced with a diode, which can prevent power output by the power supply board from recharging sub-module capacitors. When the bypass switch fails to be closed, the capacitor voltage can be further increased to store energy for the closing circuit of the bypass switch, and then, the closing instruction of the bypass switch is triggered. Through the dual configurations of energy storage in the closing circuit of the bypass switch and triggering the closing instruction, the reliability of successful bypassing is improved, the switch module and the capacitors are protected against damage under an overvoltage condition, and forced shutdown of the converter is avoided. The redundant energy acquisition circuit can be applied to non-isolation and isolation-type energy acquisition boards to fulfill the same function and improve the reliability of original systems, and has practical engineering value.

It should be noted that the embodiments described above with reference to the accompanying drawings are merely used to explain the present application and are not intended to limit the scope of the present application. Those ordinarily skilled in the art would appreciate that all modifications or equivalent substations made to the present application without departing from the spirit and scope of the present application should also fall within the scope of the present application. In addition, unless otherwise specified in the context, terms in the singular form include the plural form, vice versa. Moreover, unless otherwise specifically stated, one part or all of the contents of any one embodiment can be implemented in combination with one part or all of the contents of any another embodiment.

What is claimed is:

1. A redundant energy acquisition circuit of a power module, the power module comprising at least one power semiconductor device, a first capacitor C1 and a first bypass switch K1,
   characterized in that the redundant energy acquisition circuit of the power module comprises a first stabilivolt VD1, a second stabilivolt VD2, a second switch K2, a first resistor R1, a second resistor R2, a second capacitor C2, a power supply board and a control board;
   the first stabilivolt VD1 has a cathode connected to the positive electrode of the first capacitor C1 and an anode connected in series with the first resistor R1 and then connected to the positive electrode of the second capacitor C2, the negative electrode of the second capacitor C2 is connected to the negative electrode of the first capacitor C1;
   the second stabilivolt VD2 has a cathode connected to the positive electrode of the first capacitor C1 and an anode connected to an end of the second resistor R2; another end of the second resistor R2 is connected to the negative electrode of the first capacitor C1;
   the first bypass switch K1 is connected in parallel between an end x1 and an end x2 of the power module;
   the power supply board acquires energy from the first capacitor C1, supplies power to the control board, and charges the second capacitor C2; and
   the control board controls the first bypass switch K1 to close by triggering the second switch K2.

2. The redundant energy acquisition circuit of the power module according to claim 1, wherein the power supply board is an isolation-type power supply board and comprises an isolation transformer, and a primary-side circuit and a secondary-side circuit of the isolation transformer do not share the same ground;
   the redundant energy acquisition circuit of the power module further comprises a fourth switch K4 connected in series between a negative electrode of the second capacitor C2 and a negative electrode of the first capacitor C1;
   the fourth switch K4 is in a closed state when the power supply board does not operate and in an open state when the power supply board operates normally.

3. The redundant energy acquisition circuit of the power module according to claim 2, wherein the second switch K2, a third switch K3 or the fourth switch K4 are mechanical switches, relays, or electronic switches;
   the trigger signals of the second switch K2, the third switch K3 or the fourth switch K4 are from the power supply board or the control board.

4. The redundant energy acquisition circuit of the power module according to claim 1, wherein the power module comprises at least two power semiconductor devices and is of a semi-bridge connection form.

5. The redundant energy acquisition circuit of the power module according to claim 1, wherein the power module comprises at least four power semiconductor devices and is of a fully-bridged connection form.

6. The redundant energy acquisition circuit of the power module according to claim 1, wherein the first bypass switch K1 has a mechanical hold function after being closed, being kept in a closed state after being powered off;
   a closing signal of the first bypass switch K1 is from discharge of a second capacitor C2.

7. The redundant energy acquisition circuit of the power module according to claim 1, wherein the second switch K2, a third switch K3 or a fourth switch K4 are mechanical switches, relays, or electronic switches;
   the trigger signals of the second switch K2, the third switch K3 or the fourth switch K4 are from the power supply board or the control board.

8. The redundant energy acquisition circuit of the power module according to claim 1, wherein the first charging circuit further comprises
   a third switch K3 having one end connected to an anode of the first stabilivolt VD1 and another end connected to the first resistor R1;
   the third switch K3 is in a closed state when the power supply board does not operate and in an open state when the power supply board operates normally.

9. A control method of a redundant energy acquisition circuit of a power module according to claim 8, comprising the following steps when the power module is started, the power module malfunctions and needs to be bypassed:

step 1: in an initial state, opening the first bypass switch K1 and the second switch K2 and closing the third switch K3;

step 2: starting to charge the first capacitor C1 in the power module;

step 3: determining whether the power supply board is operating normally;

step 4: if the power supply board is operating normally, making the control board to send an instruction for closing the second switch K2, so that the second capacitor C2 discharges and triggers the first bypass switch K1 to close;

step 5: if the power supply board is not operating normally, continuing to charge the first capacitor C1;

step 6: when the capacitor voltage reaches a first threshold Vc1 of the first stabilivolt VD1, breaking down the first stabilivolt VD1;

step 7: making the first capacitor C1 to charge the second capacitor C2 through the first stabilivolt VD1, the third switch K3 and the first resistor R1;

step 8: continuing to charge the first capacitor C1, and when the capacitor voltage of the first capacitor C1 reaches a second threshold Vc2 of the second stabilivolt VD2, breaking down the second stabilivolt VD2; and step 9: triggering to close the second switch K2, so that the second capacitor C2 discharges and triggers the first bypass switch K1 to close.

10. A control method of the redundant energy acquisition circuit of the power module according to claim 8, comprising the following steps when a power module is operating normally, the power module malfunctions and needs to be bypassed:

step 1: in an initial state, opening the first bypass switch K1, the second switch K2 and the third switch K3;

step 2: when it is detected that the power module malfunctions, locking drive instructions of all switch modules;

step 3: making the control board send an instruction for closing the second switch K2 to trigger the first bypass switch K1 to close;

step 4: if the first bypass switch K1 is closed successfully, ending the process, otherwise performing the following steps;

step 5: continuing to charge the first capacitor C1, and determining whether the power supply board is operating normally, if the power supply board is operating normally, when the capacitor voltage reaches a second threshold Vc2 of the second stabilivolt VD2, breaking down the second stabilivolt VD2;

step 6: triggering the second switch K2 to close, so that the second capacitor C2 discharges and triggers the first bypass switch K1 to close;

step 7: if the power supply board is not operating normally, closing the third switch K3, continuing to charge the first capacitor C1, and when the capacitor voltage reaches a first threshold Vc1 of the first stabilivolt VD1, breaking down the first stabilivolt VD1;

step 8: continuing to charge the first capacitor C1, and when the capacitor voltage of the first capacitor C1 reaches the second threshold Vc2 of the second stabilivolt VD2, breaking down the second stabilivolt VD2; and step 9: triggering to close the second switch K2, so that the second capacitor C2 discharges and triggers the first bypass switch K1 to close.

11. The redundant energy acquisition circuit of the power module according to claim 8, wherein the second switch K2, the third switch K3 or a fourth switch K4 are mechanical switches, relays, or electronic switches;

the trigger signals of the second switch K2, the third switch K3 or the fourth switch K4 are from the power supply board or the control board.

* * * * *